United States Patent [19]

Phelps

[11] 4,181,039

[45] Jan. 1, 1980

[54] DRYER UNIT FOR WEB DRYER SECTION

[75] Inventor: Richard W. Phelps, Fulton, N.Y.

[73] Assignee: The Black Clawson Company, Middletown, Ohio

[21] Appl. No.: 848,115

[22] Filed: Nov. 3, 1977

[51] Int. Cl.[2] ........................ F16H 37/06; F26B 11/08

[52] U.S. Cl. .................................. 74/665 GA; 34/121

[58] Field of Search ...... 74/665 G, 665 GA, 665 GB, 74/665 GC, 665 GD; 34/121

[56] References Cited

U.S. PATENT DOCUMENTS

| | | | |
|---|---|---|---|
| 433,416 | 7/1890 | Marble | 74/665 GA X |
| 1,588,796 | 6/1926 | Malkin | 34/121 |
| 1,616,382 | 2/1927 | Malkin | 74/665 GC X |
| 1,616,383 | 2/1927 | Malkin | 74/665 GB X |
| 1,730,082 | 10/1929 | Malkin | 34/121 |
| 1,769,355 | 7/1930 | Malkin | 34/121 |
| 2,959,868 | 11/1960 | Clem | 34/121 |
| 3,036,475 | 5/1962 | Haupt | 74/665 GA X |
| 3,181,392 | 5/1965 | Brand | 74/665 GD |
| 3,694,927 | 10/1972 | Sorenson | 34/121 |
| 3,698,265 | 10/1972 | Williams | 74/665 GA |

FOREIGN PATENT DOCUMENTS

| | | | |
|---|---|---|---|
| 1550865 | 7/1969 | Fed. Rep. of Germany | 74/665 GA |

*Primary Examiner*—C. J. Husar
*Assistant Examiner*—Lance W. Chandler
*Attorney, Agent, or Firm*—Biebel, French & Nauman

[57] ABSTRACT

A dryer section of a web making or web processing machine comprises a plurality of drying cylinders disposed in spaced relationship so as to provide drying surfaces for alternately drying both sides of a web. The section comprises one or more sets of paired drying cylinders, each set being driven by a single drive coupled to each cylinder in the set by a gear reduction unit supported by the dryer journals. The gear reduction unit is so constructed and arranged as to accommodate a substantial range of spacings of the set of cylinders which it drives, and also a substantial amount of relative deflection of the journals.

8 Claims, 4 Drawing Figures

DRYER UNIT FOR WEB DRYER SECTION

BACKGROUND OF THE INVENTION

The present invention relates to dryers for paper and other web materials, and more particularly to a drive unit for driving a pair of drying drums or cylinders in a dryer section.

Conventional dryer sections in the web making and web processing industries comprise a plurality of drying cylinders or dryer rolls, each of which has its journals supported in suitable bearings. Frame means arranged symmetrically about the machine center line support these bearings with the drive gearing located either inboard or outboard of the drive side frame means. A common practice is to have from three or four to as many as 20 or 30 dryer rolls connected to one input drive pinion.

Increased web speeds in web making and web processing lines have led to combining the drive side framing and the gear enclosures so as to provide support for the dryer bearings and also to enclose lubricated gear trains leading from the single drive pinion for multiple drying cylinders. Such configurations require non-symmetrical foundations giving rise to multiple erection and maintenance problems, and for reasons of economy, this in turn has tended to result in limiting the preferred draw arrangement within each dryer section as the processed web changes in strength and length.

Dryer sections have also been constructed wherein each dryer roll is provided with its own input drive unit, and while this makes possible individual draw control for each roll, the system as a whole is overly complicated and expensive in comparison with the benefits derived therefrom.

BRIEF SUMMARY OF THE INVENTION

The present invention overcomes the limitations of the prior art summarized above by providing a gear reduction unit designed to drive pairs of dryer rolls in a dryer section from a single input drive, and which is mounted on the drive journals of the pair of rolls without requiring specific supporting framing.

In addition to the draw capability contributed by the multiple input drive points of the invention in each dryer section, the construction of the individual drive unit of the invention, which is mounted on the journals of a pair of dryer rolls, provides multiple advantages, including positive lateral positioning of the gear reduction unit, pressure engagement with the driven gears, clearance between the journal and drive gear hub of one dryer roll in the driven pair of rolls to accommodate differences in dryer and dryer journal deflections which could cause the second journal to run eccentrically with respect to its driving gear hub, and allowance for relative lateral shifting of the gear hub with respect to its associated journal as required to accommodate relative deflection of the two paired dryer rolls.

Each drive unit in accordance with the invention is essentially self-contained, and while each includes a gear case designed for a specific spacing of the journals of the pair of dryer rolls with which the unit is to be used, all other parts are the same for the entire range of gear case sizes. For example, referring to the preferred embodiment described hereinafter, the gear cases are proportioned for roll journal spacing in 4-inch increments from 64 inches to 80 inches, but all other parts, including all gears, are the same for all of those sizes of gear cases. The only difference other than gear case size between different units is the angular positioning of the gear transmission on the gear case to effect proper meshing of the drive gears on the roll journals with the gears by which they are directly driven.

Another significant advantage derived from the units of the invention as summarized above is that they are effectively hung on the roll journals and do not require specific support means on the dryer section framing. More specifically, one of the two drive gears is locked on the journal of one of the paired rolls, while the second drive gear has a floating connection with the second roll journal which provides substantial tolerance for deflection of the journal itself or between the two journals. Preferably, however, the drive unit is secured to the framing through adjustable means, such as a turnbuckle, which both locates the second of the drive gears with its associated journal and also neutralizes the turning moment generated by having the drive unit entirely supported on one roll journal.

In the preferred practice of the invention, the drive unit for each pair of dryer rolls is provided with its own drive motor, which may be mounted either directly on the drive unit or on a separate support. In either case, this arrangement facilitates the application to the dryer section of a drive control system which will establish the proper speed relationship of each pair of dryer rolls to the next, as required to adjust and maintain proper draw conditions on the web as its length changes with increased dryness.

DESCRIPTION OF THE PREFERRED EMBODIMENT

Figure 1:
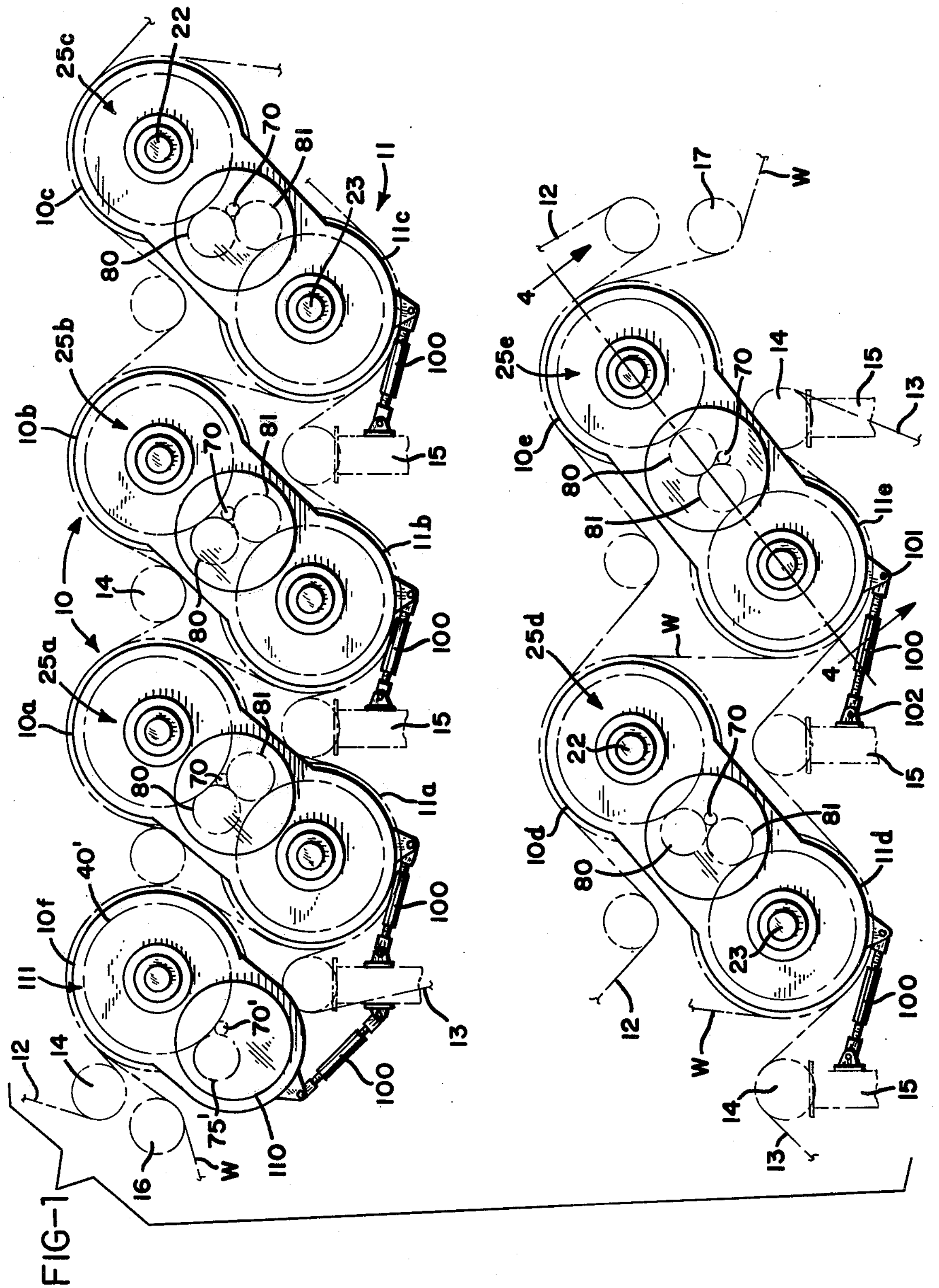
FIG. 1 is a somewhat diagrammatic side elevation of a paper machine dryer section provided with drive units in accordance with the invention.

FIG. 1 shows a dryer section for a paper machine comprising a plurality of upper dryer rolls 10 and lower dryer rolls 11 provided with dryer felts 12 and 13 respectively and cooperating felt support rolls 14, all of the rolls 10, 11 and 14 being individually supported by suitable framing 15. The paper web W enters the dryer section by way of a support roll 16 and leaves by way of a second support roll 17. With one exception, the dryer rolls 10 and 11 are arranged in pairs identified as 10(*a*)-11(*a*), 10(*b*)-11(*b*), and so forth, the exception being the single upper roll 10(*f*) at the upstream end of the dryer section. For the purpose of illustrating the principles of the invention, the successive pairs of dryer rolls are shown in FIG. 1 as having their axes supported on progressively more widely spaced centers, but all individual rolls 10 and 11 are shown as of the same diameter, e.g. 60 inches.

Figure 2:
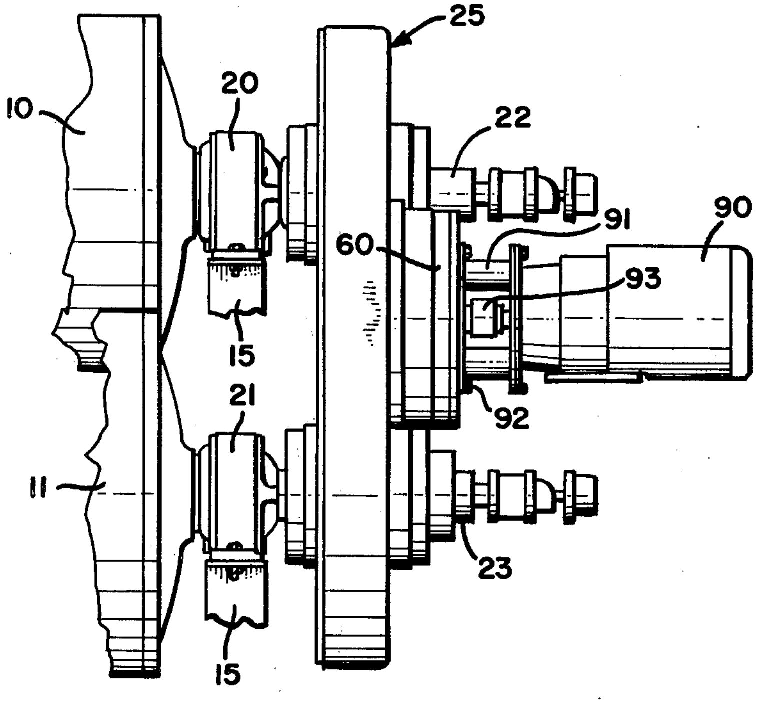
FIG. 2 is a fragmentary view taken at right angles to FIG. 1 and showing one arrangement of drive motor for one of the drive units in FIG. 1.

Each of the dryer rolls 10 and 11 includes a conventional journal at each end supported in suitable bearings on the framing 15, only the bearings 20 and 21 for the front or drive side journals 22 and 23 being shown in FIG. 2, and these journals 22 and 23 are illustrated as provided with the usual connections 24 for admitting steam to the interior of the roll and withdrawing condensation therefrom. The invention is particularly directed to the gear reduction units identified generally as 25 which drive each of the paired rolls 10 and 11 as now described.

Figure 4:
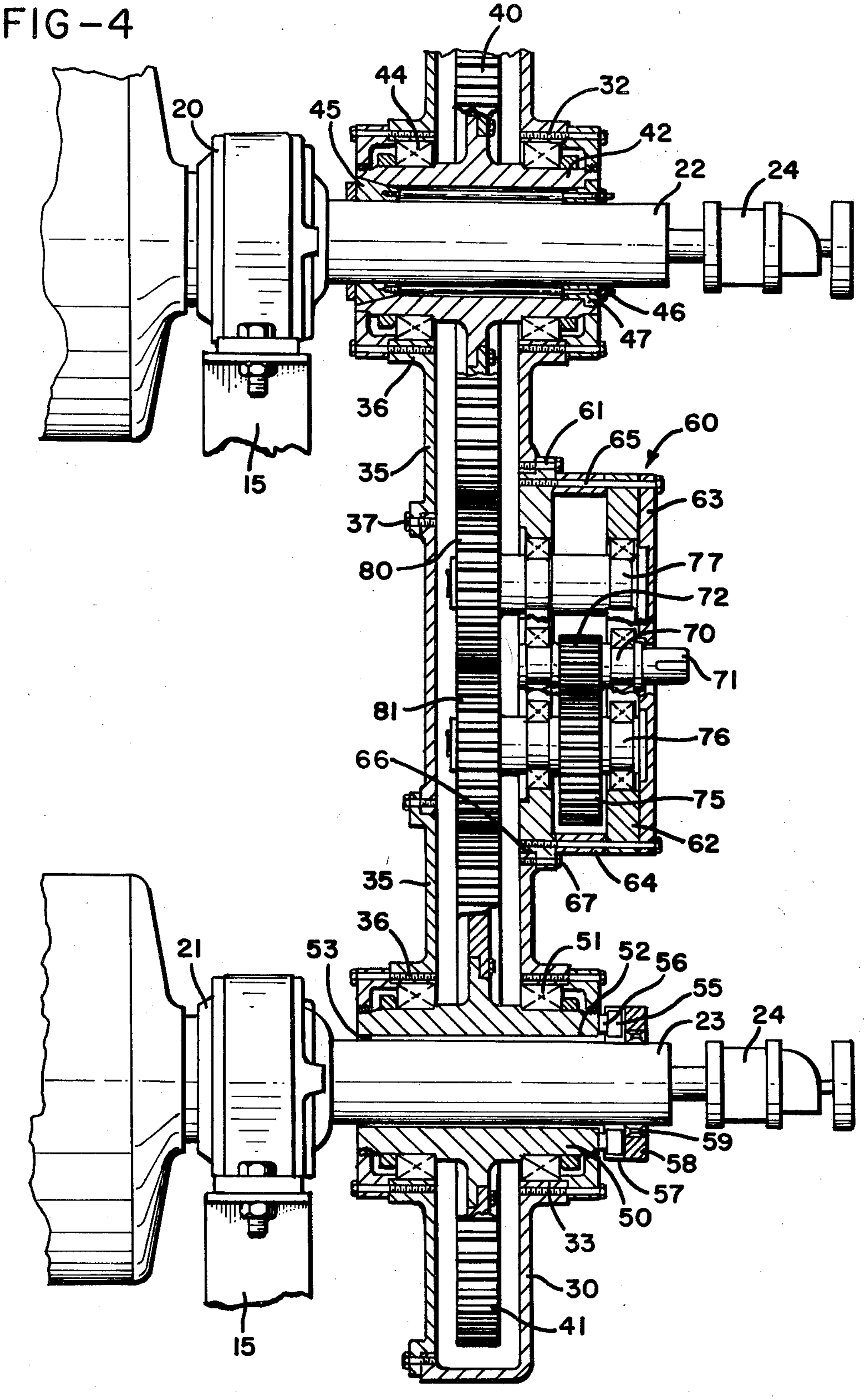
FIG. 4 is an enlarged fragmentary section generally on the line 4—4 of FIG. 1.

FIG. 4 illustrates the construction of the gear reduction drive unit 25(*e*) for the most widely spaced pair of dryer rolls 10(*e*)–11(*e*). Its main structural component is a gear case 30 having a straight center portion and rounded end portions which are provided with appropriately spaced openings 32 and 33 for the journals 22 and 23 respectively. The rounded end portions of gear case 30 are open on the inside of the gear case and are provided with correspondingly shaped covers 35, each of which also has a central opening 36 matching the front side opening 32 or 33, the covers 35 being bolted in place as indicated at 37.

The rounded end portions of gear case 30 house the main drive gears 40 and 41 for the dryer rolls 10(*e*) and 11(*e*) respectively, all of these gears being individually identical. The hub 42 of gear 40 is journalled in the gear case 30 and associated cover 35 by a bearing assembly indicated generally at 44, and it is locked to the journal 22 by suitable means shown as a tapered wedge ring 45 and associated bolts 46 and a complementary ring 47.

The other main drive gear 41 is loosely connected with its associated journal 23. The gear hub 50 is journalled in the gear case 30 and associated cover 35 by a bearing assembly 51 which may be the same as for hub 42, but the center bore 52 of hub 50 is sized to provide radial clearance 53 for journal 23, e.g. approximately 0.10 inch.

The gear hub 50 and journal 23 are provided with a floating driving connection designed to provide for misalignment of journal 23 within clearance 53. It is shown as comprising a plurality of cam follower rollers 55 carried by bolts 56 threaded into the end of hub 50, with the rollers 55 engaging in complementary slots 57 in a cam ring 58 locked on journal 23 by means 59 such as a lock ring assembly, set screw or other conventional means.

The input drive transmission for gears 40 and 41 is carried by a cylindrical housing identified generally as 60 and comprising a base plate 61, front plate 62, cover plate 63 and spacer ring 64 all secured together by bolts 65. This housing assembly 60 is in turn rotatably mounted in a complementary center opening 66 in gear case 30 by bolts 67 extending through the peripheral flange portion of base plate 61.

The input drive shaft 70 is journalled in the housing plates 60 and 61 in laterally offset eccentric relation with the central axis of the housing, and its outer end 71 projects through cover plate 63 for attachment to a drive source as described hereinafter. A drive pinion 72 is secured on shaft 70 within the housing and meshes with an intermediate gear 75 on a shaft 76 journalled in plates 61–62. A similarly journalled shaft 77 is located in line with shaft 76 on the opposite side of the central axis of housing 60. Both of shafts 76 and 77 project beyond the base plate 61 into the interior of gear case 30 and carry gears 80 and 81 meshing with each other and with the main drive gears 40 and 41 respectively to complete the drive gear transmission from input shaft 70 to the dryer roll journals 22 and 23.

In a typical example of drive unit in accordance with the invention which is designed for 60 inch dryer rolls, the main drive rolls 40 and 41 have pitch diameters of 49 inches, the input drive pinion 72 has a 5-inch pitch diameter, the intermediate gear 75 has a 14.5-inch pitch diameter and the pair of gears 80 and 81 have 15.5-inch pitch diameters, the complete gear train providing a 9.17:1 overall ratio.

The offset mountings of the shafts 76 and 77 in the transmission housing provide one of the major advantages of the invention, which is to use the same gear transmission with gear cases of a substantial range of sizes in terms of the dimension between the centers of the dryer roll journals with which the drive units are to be used.

This feature is illustrated in FIG. 1, wherein the dryer rolls 10(*e*) and 11(*e*) are the most widely spaced, the rolls 10(*a*) and 11(*a*) are the most closely spaced, and the other three pairs of rolls 10 and 11 are each at a different intermediate spacing. The housing 60 for the rolls 10(*e*) and 11(*e*) therefore is mounted on its supporting gear case with the axes of shafts 76 and 77 in line with the line connecting the axes of the associated roll journals. In the case of rolls 10(*a*) and 11(*a*), however, the housing 60 is mounted with the diameter through the axes of shafts 76 and 77 defining perpendicular to the line connecting the axis of the associated roll journals.

Similarly the transmission housings 60 for the three intermediately spaced pairs of dryer rolls are mounted in appropriately different angular relation with the associated gear case, as shown in FIG. 1, to effect the appropriate meshing relation of the corresponding gears 80 and 81 with their associated drive gears 40 and 41.

The arrangement in FIG. 1 represents gear cases designed to accommodate a range of spacings between the paired roll journals from 64 inches to 80 inches in 4-inch increments. As a practical matter, it is necessary only that the dryer section by initially designed to establish the particular such spacing, after which the gear housings are simply designed accordingly, with the floating connections to each drive gear 41 providing sufficient tolerances for both initial installation and deflections in use. Thus the only part of the drive units of the invention which is not the same for all sizes within a practical range is the gear case 30, since the same gear transmission can be used throughout the range, and also the same gear case covers 35.

The arrangement of gears as shown and described promotes the maximum ratio with the minimum number of gears in a unit of conveniently small but versatile size. The same advantage is also contributed to by the eccentric mounting of input shaft 70 in the housing 60, since this makes it possible to use a larger intermediate gear 75 than would otherwise be possible in the same size of housing if the input shaft 70 were centered in the housing. The same shaft arrangement makes it possible to use a wide selection of gears 72 and 75 to produce a desired initial ratio for shafts 70 and 76.

Figure 3:
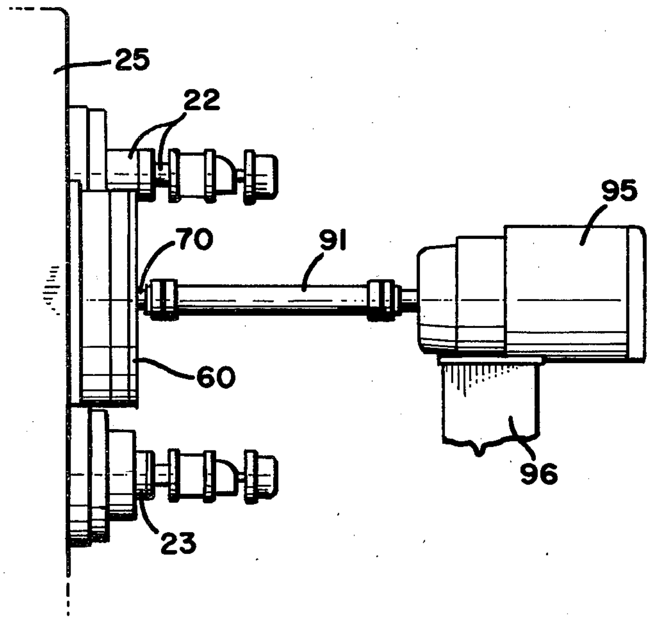
FIG. 3 is a view similar to FIG. 2 showing another drive motor arrangement.

Another practical advantage of the invention is the provision for mounting the drive motor 90 for each drive unit directly thereon as illustrated in FIG. 2, wherein the drive motor 90 is mounted directly on the transmission housing 60 by a bracket 91 bolted at 92 to the front of the transmission housing and enclosing a coupling 93 between the motor shaft and input shaft 70. It is also possible to utilize the drive units of the invention with separately mounted motors as shown in FIG. 3, wherein the motor 95 has its own mount 96 and has its drive shaft connected by a coupling 97 to the associated input shaft 70. This arrangement is particularly desirable for hooded dryer sections in that it enables mounting of the motors outside the hood enclosing the dryer rolls.

The invention also lends itself particularly well to use with a control system for the drive which provides for individual control of each drive motor 90 or 95 to establish appropriate draw conditions from each pair of dryer rolls to the next downstream pair. Thus instead of separately controlling each dryer roll, which is undesirably complex as pointed out above, the drive unit of the invention drives each pair of rolls at the same speed but facilitates the establishment of a speed differential between adjacent pairs as required to maintain the proper consistent draw on the shaft as it progresses from one end of the dryer section to the other.

With each gear case fixedly mounted on one of the journals of the two rolls it is to drive and provided with only a torque drive connection to the journal of the second roll, it is required to provide means for positioning the gear hub of the second roll drive concentric with the roll journal, and thereby at the same time overcoming the rotational force caused by the gear case weight from being transmitted to the second roll journal. This is accomplished, as shown in FIG. 1, by a torque bar in the form of a turnbuckle 100 pivotally connected at 101 to the lower end of each gear case 30 and having its other end pivoted to a bracket 102 mounted on an adjacent part of the framing 15.

This torque bar arrangement contributes to the advantages of the invention in a number of ways. When the dryer section is initially installed, it serves to position each gear drive unit with its drive gear 41 concentric with the associated roll journal 33, and it also assures that none of the supporting load for the drive unit will be transmitted to the journal 23 through the floating driving connection with its drive gear 41. At the same time, the clearance for journal 23 in the hub of gear 41 will accommodate deflections of either journal which cause their centers to move radially relative to each other, as well as relative lateral movement of the journal 23 and the hub of its gear 41 such as may be necessary to follow deflection of the associated journal 22.

FIG. 1 also shows a modified form of gear drive unit for the single dryer roll **10(*f*). The gear transmission housing 110 in FIG. 1 is identical with the housings 60, but one of the intermediate gear shafts is omitted, namely the shaft corresponding to shaft 77 in the other views. The other parts in this transmission are the same as in the other views and are therefore identified as 70', 75' and so forth. The gear case 111 necessarily differs from the other gear cases in that it is designed for use with only a single drive gear 40 which is fixedly mounted on the journal of dryer roll 10(*f*) in the same manner as the other gears 40 already described. Since this drive unit is connected to only a single dryer roll, it requires locking to the framing 15 by means of a turnbuckle 100** as shown.

While the forms of apparatus herein described constitute preferred embodiments of the invention, it is to be understood that the invention is not limited to these precise forms of apparatus, and that changes may be made therein without departing from the scope of the invention.

What is claimed is:

1. A gear drive unit for driving a pair of parallel shafts spaced a predetermined distance apart, comprising
   (a) a main gear case proportioned to receive said shafts through opposite end portions thereof,
   (b) a pair of main gears mounted for rotation in said end portions, respectively, of said gear case in properly spaced relation to receive said shafts therethrough,
   (c) means for connecting said main gears in driving relation with said shafts respectively,
   (d) an input transmission housing mounted on said gear case intermediate the axes of said main gears and rotatable about a central axis equidistant from and parallel to said main gear axes,
   (e) a pair of parallel stub shafts journalled in said housing in eccentric parallel relation with said central axis and including portions projecting into said gear case,
   (f) an input shaft journalled in said housing and adapted for connection to a drive motor,
   (g) a drive pinion secured on said input shaft,
   (h) an intermediate gear secured on one of said stub shafts in driven engagement with said drive pinion,
   (i) a pair of intermediate gears one each secured on a respective one of said projecting portions of said stub shafts in meshing engagement with each other, and
   (j) means for securing said transmission housing to said gear case in angularly adjusted position about said central axis wherein said pair of intermediate gears are in driving engagement with said main gears respectively.

2. A gear drive unit as defined in claim 1 wherein said input shaft is journalled in said housing eccentrically of said central axis of said housing.

3. A gear drive unit as defined in claim 1 further comprising means for mounting a drive motor directly on said transmission housing with the drive shaft thereof connected to said input shaft.

4. A drive gear unit as defined in claim 1 further comprising means forming a rotatable mounting for said transmission housing on said gear case for effecting angular adjustment of said housing into the position of meshing engagement between said pair of intermediate gears and said main gears.

5. The combination of a gear drive unit as defined in claim 1 and a pair of dryer rolls in a dryer section wherein said shafts are the drive journals of said dryer rolls, and which also comprises frame means for supporting said dryer rolls, means for supporting said gear case on one of said drive journals, and means for effecting a rigid connection between said gear case and said frame means to prevent angular movement of said gear case with respect to said one journal.

6. A gear drive unit for driving a pair of parallel shafts spaced a predetermined distance apart, comprising
   (a) a main gear case proportioned to receive said shafts through opposite end portions thereof,
   (b) a pair of main gears mounted for rotation in said end portions, respectively, of said gear case in properly spaced relation to receive said shafts therethrough,
   (c) means for fixedly securing one of said main gears to the associated said shaft, and means forming a floating driving connection between the other of said main gears and the other associated said shaft providing for relative radial and axial movement between said other main gear and said other associated shaft,
   (d) an input transmission housing mounted on said gear case intermediate the axes of said main gears and rotatable about a central axis equidistant from and parallel to said main gear axes, (e) a pair of parallel stub shafts journalled in said housing in eccentric parallel relation with said central axis and including portions projecting into said gear case, (f) an input shaft journalled in said housing and adapted for connection to a drive motor, (g) a drive pinion secured on said input shaft, (h) an intermediate gear secured on one of said stub shafts in driven engagement with said drive pinion, (i) a pair of intermediate gears one each secured on a respective one of said projecting portions of said stub shafts in meshing engagement with each other, and (j) means for securing said transmission housing to said gear case in angularly adjusted position about said central axis wherein said pair of intermediate gears are in driving engagement with said main gears respectively.

7. A gear drive unit for driving a pair of parallel shafts spaced a predetermined distance apart, comprising (a) a main gear case proportioned to receive said shafts through opposite end portions thereof, (b) a pair of main gears mounted for rotation in said end portions, respectively, of said gear case in properly spaced relation to receive said shafts therethrough, (c) means for supporting said gear case on one of said parallel shafts free of support on the other said shaft and with one of said main gears fixedly connected with said one shaft, and means for forming a floating driving connection between the other of said main gears and the other associated said shaft providing for relative radial and axial movement therebetween.

(d) an input transmission housing mounted on said gear case intermediate the axes of said main gears and rotatable about a central axis equidistant from and parallel to said main gear axes, (e) a pair of parallel stub shafts journalled in said housing in eccentric parallel relation with said central axis and including portions projecting into said gear case, (f) an input shaft journalled in said housing and adapted for connection to a drive motor, (g) a drive pinion secured on said input shaft, (h) an intermediate gear secured on one of said stubs shafts in driven engagement with said drive pinion, (i) a pair of intermediate gears one each secured on a respective one of said projecting portions of said stub shafts in meshing engagement with each other, and (j) means for securing said transmission housing to said gear case in angularly adjusted position about said central axis wherein said pair of intermediate gears are in driving engagement with said main gears respectively.

8. A gear drive unit for driving a pair of dryer rolls in a dryer section having a pair of parallel shafts forming drive journals of said dryer rolls, and having frame means for supporting said dryer rolls, said gear drive unit, comprising (a) a main gear case proportioned to receive said drive journals through opposite end portions thereof, (b) means for supporting said gear case on one of said drive journals, (c) means for effecting a rigid connection between said gear case and said frame means to prevent angular movement of said gear case with respect to said one journal, (d) a pair of main gears mounted for rotation in said end portions, respectively, of said gear case in properly spaced relation to receive said journals therethrough, (e) means forming a fixed driving connection between said one journal and the associated said main gear, and means forming a floating driving connection between the other of said main gears and the other of said journals providing for relative radial and axial movement therebetween, (f) an input transmission housing mounted on said gear case intermediate the axes of said main gears and rotatable about a central axis equidistant from and parallel to said main gear axes, (f) a pair of parallel stub shafts journalled in said housing in eccentric parallel relation with said central axis and including portions projecting into said gear case, (h) an input shaft journalled in said housing and adapted for connection to a drive motor, (i) a drive pinion secured on said input shaft, (j) an intermediate gear secured on one of said stub shafts in driven engagement with said drive pinion, (k) a pair of intermediate gears one each secured on a respective one of said projecting portions of said stub shafts in meshing engagement with each other, and (l) means for securing said transmission housing to said gear case in angularly adjusted position about said central axis wherein said pair of intermediate gears are in driving engagement with said main gears respectively.

* * * * *